US006220531B1

(12) United States Patent
Pierce et al.

(10) Patent No.: US 6,220,531 B1
(45) Date of Patent: Apr. 24, 2001

(54) CONVEYING, SPREADING AND MILLING APPARATUS

(76) Inventors: Kevin J. Pierce, R.R. #1, Box 124P; Michael J. Pierce, R.R. #1, Box 122, both of Grand Forks, ND (US) 58201; Karen Dufault, R.R. #1, Box 45b; Wayne A. Pierce, R.R. #1, Box 45c, both of East Grand Forks, MN (US) 56721

( * ) Notice: Subject to any disclaimer, the term of this patent is extended or adjusted under 35 U.S.C. 154(b) by 0 days.

(21) Appl. No.: 09/070,173

(22) Filed: Apr. 30, 1998

Related U.S. Application Data

(63) Continuation-in-part of application No. 08/719,786, filed on Sep. 25, 1996.

(51) Int. Cl.⁷ .................................................. A01C 19/00
(52) U.S. Cl. .............................................................. 239/672
(58) Field of Search ..................................... 239/650, 655, 239/671, 663, 672, 673, 679, 680, 683, 658; 241/101.762

(56) References Cited

U.S. PATENT DOCUMENTS

| 2,672,347 | * | 3/1954 | Rausch | 239/663 |
|---|---|---|---|---|
| 2,701,596 | * | 2/1955 | Myrold et al. | 239/672 |
| 2,952,466 | * | 9/1960 | Carlson et al. | 239/679 |
| 2,958,530 | * | 11/1960 | Kucera et al. | 239/658 |
| 3,175,830 | * | 3/1965 | Lepp | 239/679 |
| 3,412,943 | * | 11/1968 | Lewis et al. | 239/663 |
| 3,561,681 | * | 2/1971 | Tyler | 239/663 |
| 3,863,850 | * | 2/1975 | Freeman | 241/101.762 |
| 3,873,032 | * | 3/1975 | Jellis, Jr. | 239/658 |
| 3,902,667 | * | 9/1975 | Jackson | 239/167 |
| 3,933,314 | * | 1/1976 | Luscombe | 241/101.762 |
| 4,526,180 | * | 7/1985 | Scott et al. | 239/672 |
| 4,657,191 | * | 4/1987 | Dwyer et al. | 241/101.762 |

* cited by examiner

Primary Examiner—Andres Kashnikow
Assistant Examiner—Dinh Q. Nguyen
(74) Attorney, Agent, or Firm—Robert E. Kleve

(57) ABSTRACT

The invention is a mobile bin with two conveyors with each mounted on a main frame and with the main frame having wheels for rotatably supporting the vehicle along the ground. The bin has an opening along its bottom and the first belt conveyor is mounted beneath the opening in the bin and its remote ends extend to the opposite ends of the bin. A second elongated belt conveyor pivotally mounted about a vertical axis on the main frame of the bin vehicle from a storage position parallel in length to and beside and below the first belt conveyor to different positions laterally in length to the first belt conveyor with it one end remaining below and now beneath the one end of the first belt conveyor, said second belt conveyor being further pivotable about its one end on said mean frame to raise and lower the other end of the second belt conveyor while its one end remains below and beneath the one end of the first belt conveyor, whereby material may be conveyed from the bin opening by the first conveyor to its one end and then conveyed onto the second conveyor beneath the one end of the first conveyor whereupon it may be conveyed by the second conveyor laterally outward or laterally outward and upward from the one end of the first conveyor.

6 Claims, 7 Drawing Sheets

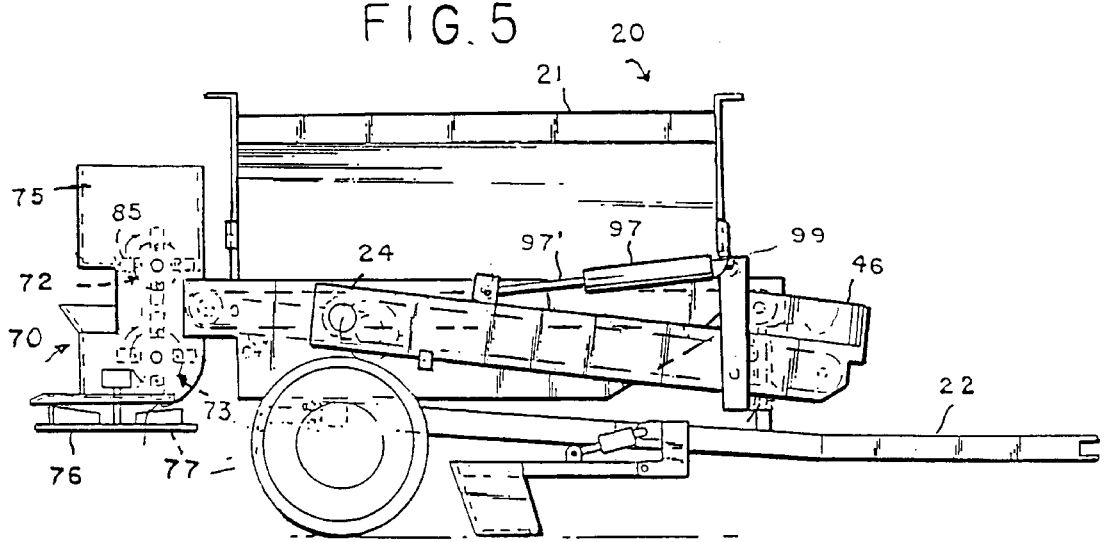
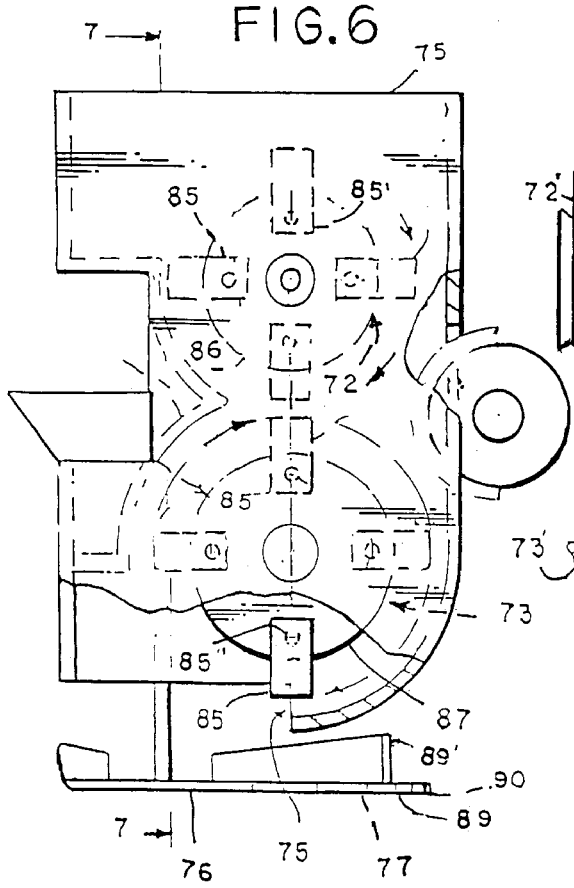
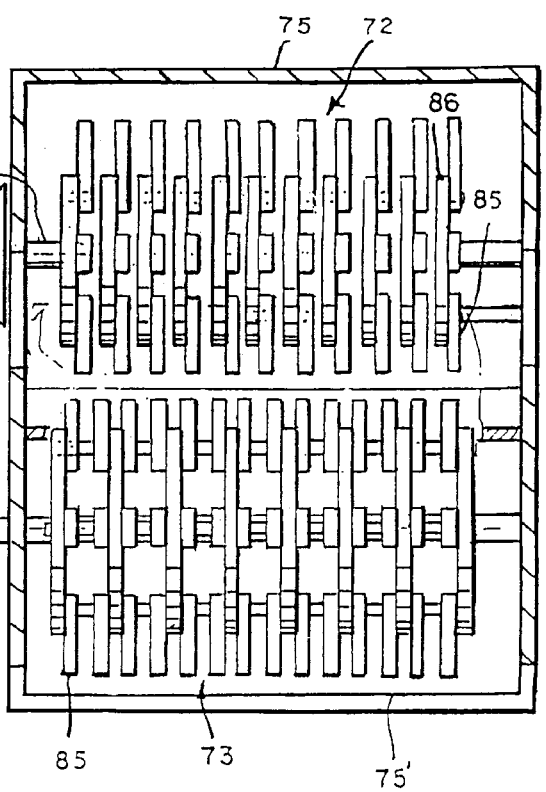

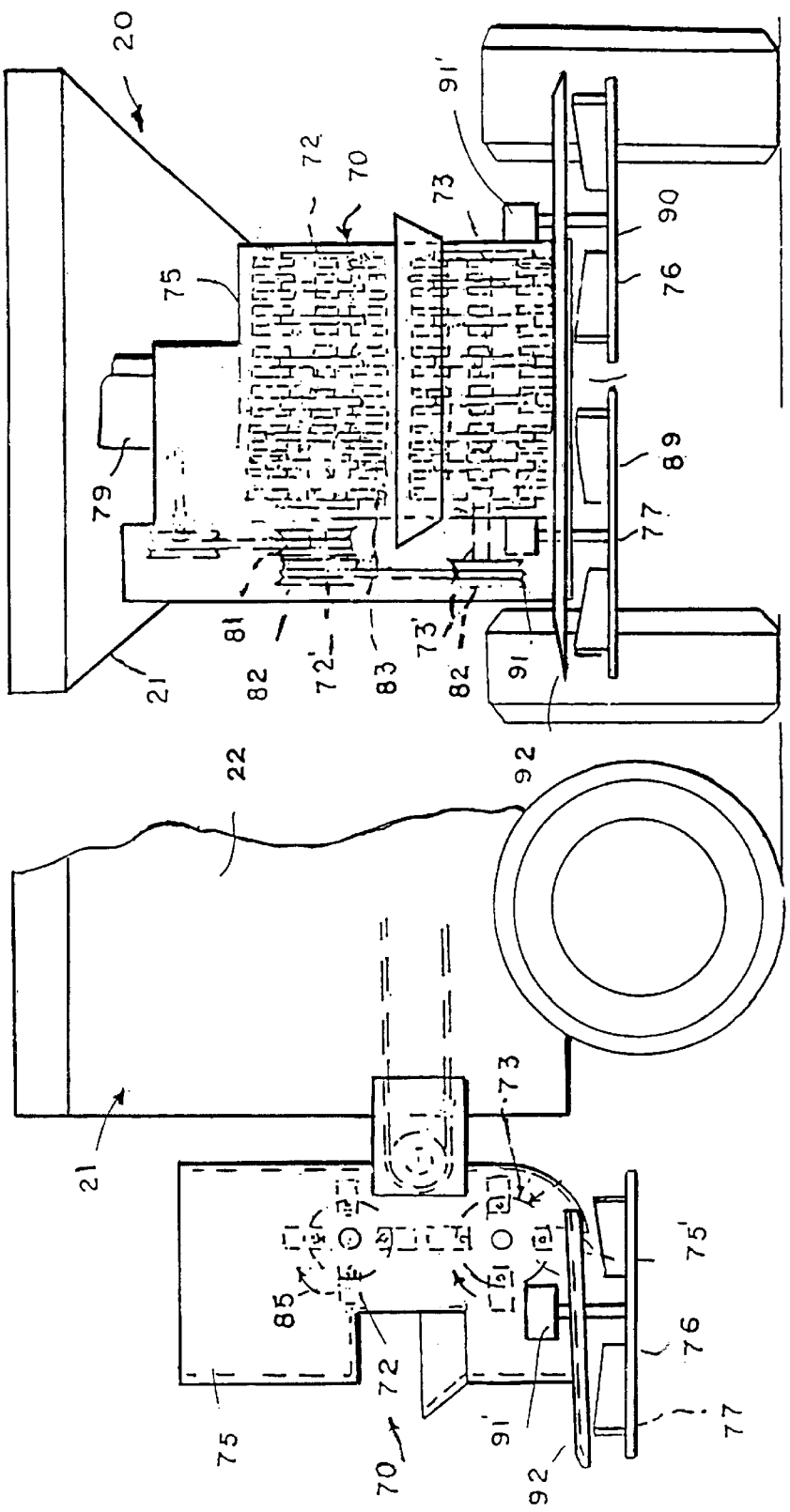

CONVEYING, SPREADING AND MILLING APPARATUS

This application is a continuation in part of our earlier co-pending U.S. patent application, U.S. Ser. No. 08/719,786, filed: Sep. 25, 1996, entitled: Spreading and Conveying Apparatus.

This invention relates to spreading, conveying, and/grinding and milling of material.

It is an object of the invention to provide a novel vehicle having a bin for containing material with a conveyor along the bottom of the bin for conveying the material to either end of the bin, with a spreader at one end of the bin and a second conveyor at the other end of the bin, with the conveyor being reversable to convey the material to the end of the bin having the spreader or to the other end of the bin having a second conveyor for spreading or further conveying the material.

It is another object of the invention to provide a novel material handling device for distributing material from either end of a bin.

It is another object of the invention to provide a novel mobile bin having conveying means to convey material in the bin to one end of the bin, with a milling attachment at the end of the bin for milling the material conveyed thereto, and with a spreading mechanism mounted beneath the milling attachment for spreading the material on the ground after it has been conveyed and milled.

It is a further object of the invention to provide a novel milling or grinding attachment to a mobile bin.

Further objects and advantages of the invention will become apparent as the description proceeds and when taken in conjunction with the accompanying drawings wherein:

BRIEF DESCRIPTION OF THE DRAWINGS

FIG. 5 is a side elevational view of a modified form of the invention having a milling or grinding attachment mounted to the bine between the one end of the conveyor and the material spreading discs or mechanism.

FIG. 6 is an enlarged fragmentary side view of the milling or grinding wheel mechanism of the modified form the invention.

FIG. 7 is a cross sectional view taken along line 7—7 of FIG. 6.

FIG. 8 is a rear enlarged side elevational view of the milling attachment shown attached to the mobile bin of the modified form of the invention.

FIG. 9 is a rear elevational view of the milling or grinding attachment shown attached to the mobile bin of the modified form of the invention.

BRIEF DESCRIPTION OF THE PREFERRED EMBODIMENT

Briefly stated, the invention comprises a mobile bin vehicle having a main frame with a bin mounted on the main frame. A rotary blade or disc mechanism is mounted at one end of the bin, and a first conveyor is mounted along the bottom of the bin beneath an opening in the bin and reversably powered for conveying material from the bin to either end of the bin. The rotary blade mechanism has vanes acting to spread material received from the first conveyor from the opening in the bin. A milling or grinding mechanism is mounted between the first conveyor and the rotary blade mechanism for milling and grinding material after it is received from the first conveyor and before it is spread by the rotary blade mechanism. A second conveyor is pivotally mounted to the main frame at the other end of the first conveyor, with the other end of the second conveyor adapted to be extended out laterally from the other end of the bin whereby the second conveyor may receive material from the bin conveyed by the first conveyor and convey the material out laterally away from the bin.

Figure 1:
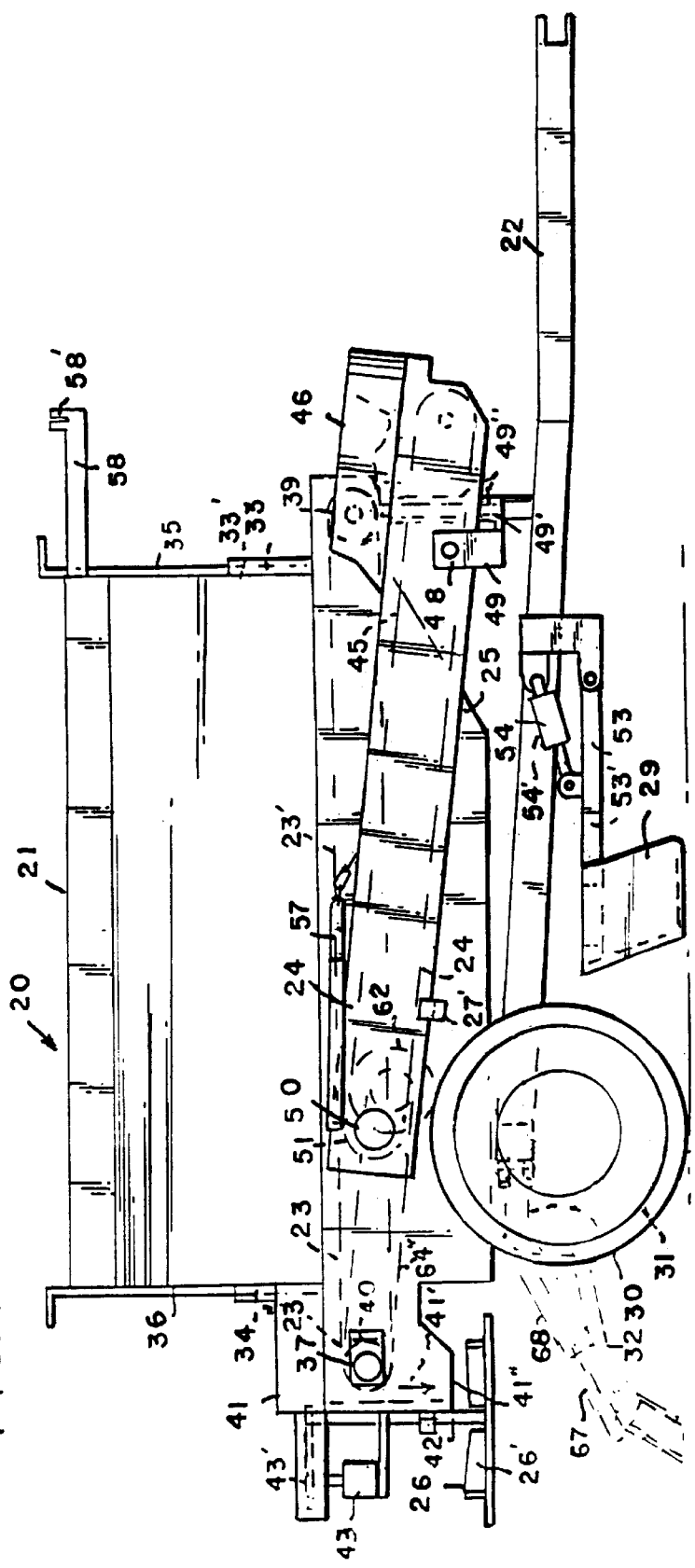
FIG. 1 is a side elevation view of the mobile bin invention having a rotary blade material distributing mechanism at one end of the bin and a conveyor distributing mechanism at the other end of the bin for selectively distributing material from either end of the bin.
Figure 2:
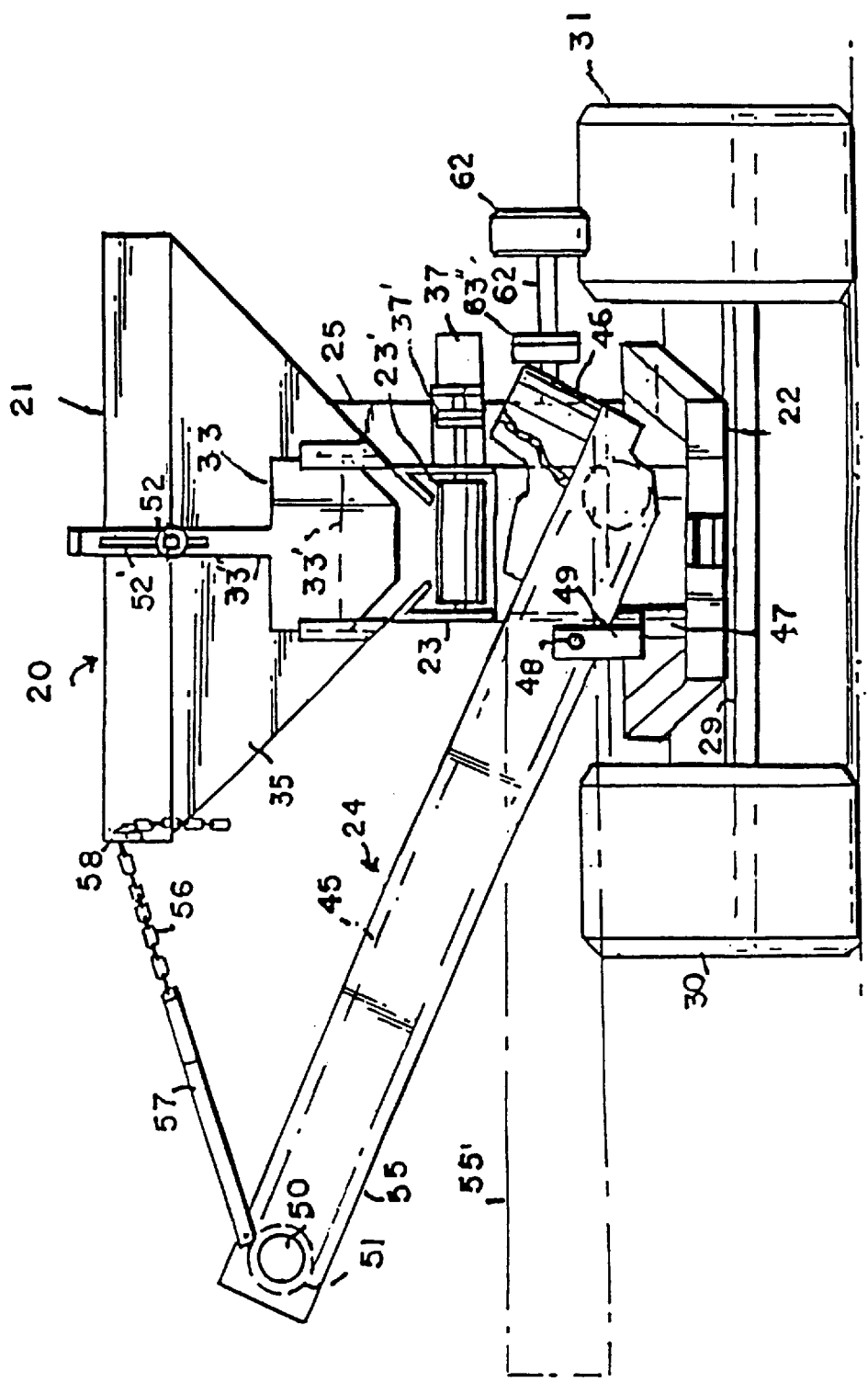
FIG. 2 is a front end view of the mobile bin invention illustrating the second conveyor in operative position for distributing material from one end of the bin after being conveyed by the first conveyor.
Figure 3:
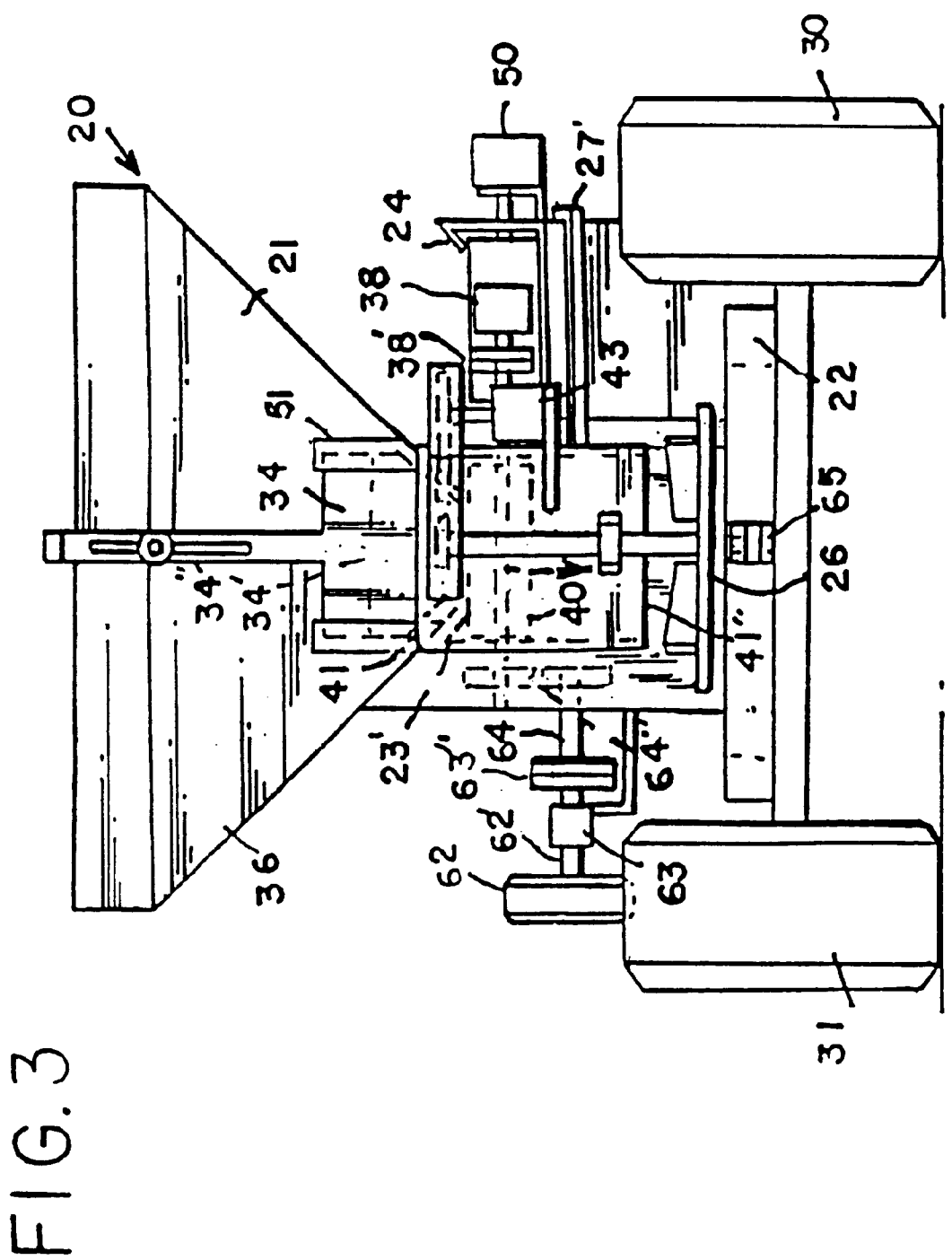
FIG. 3 is a rear end view of the mobile bin invention.
Figure 4:
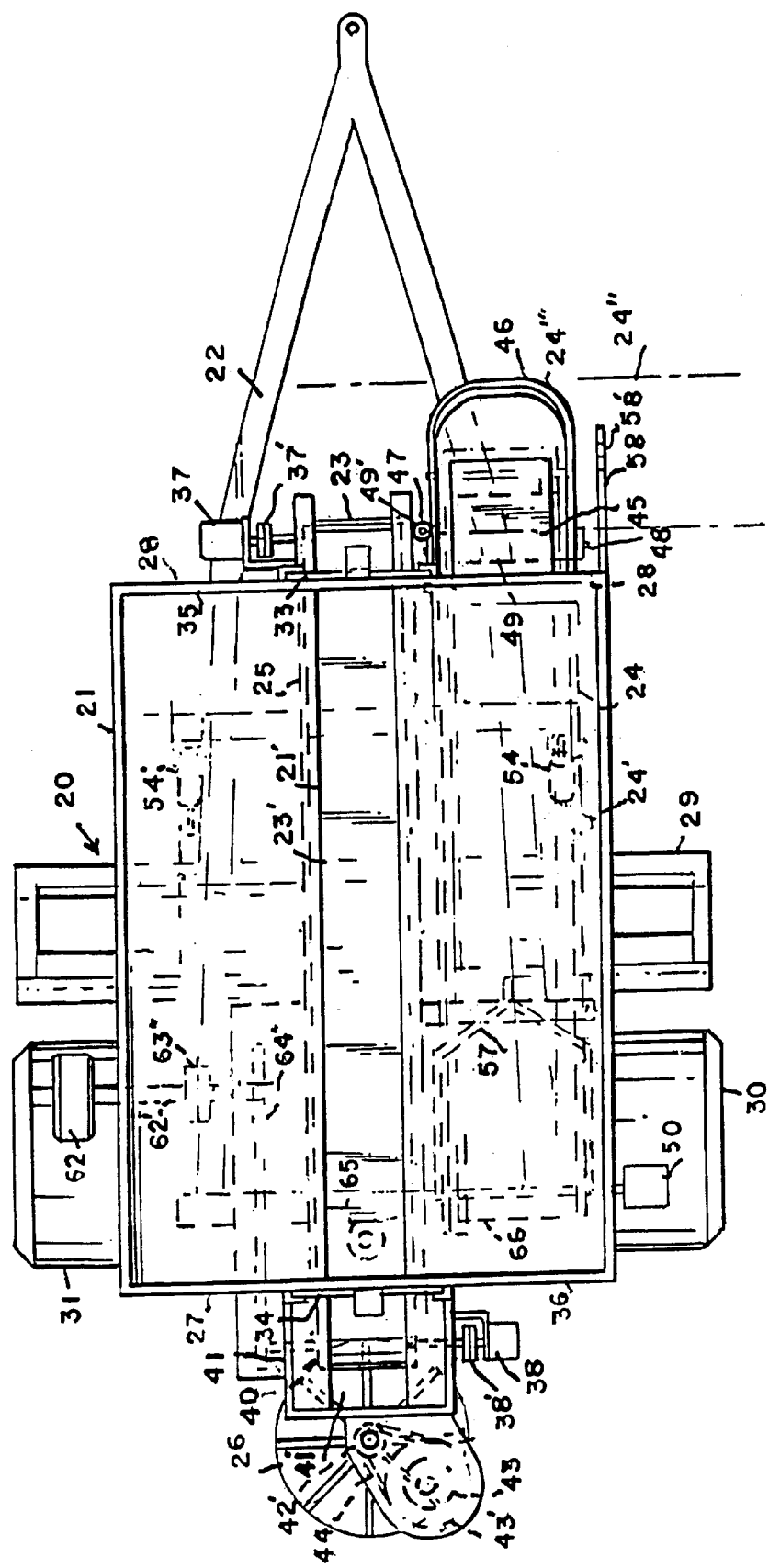
FIG. 4 is a top plan view of the mobile bin invention.
Figure 10:
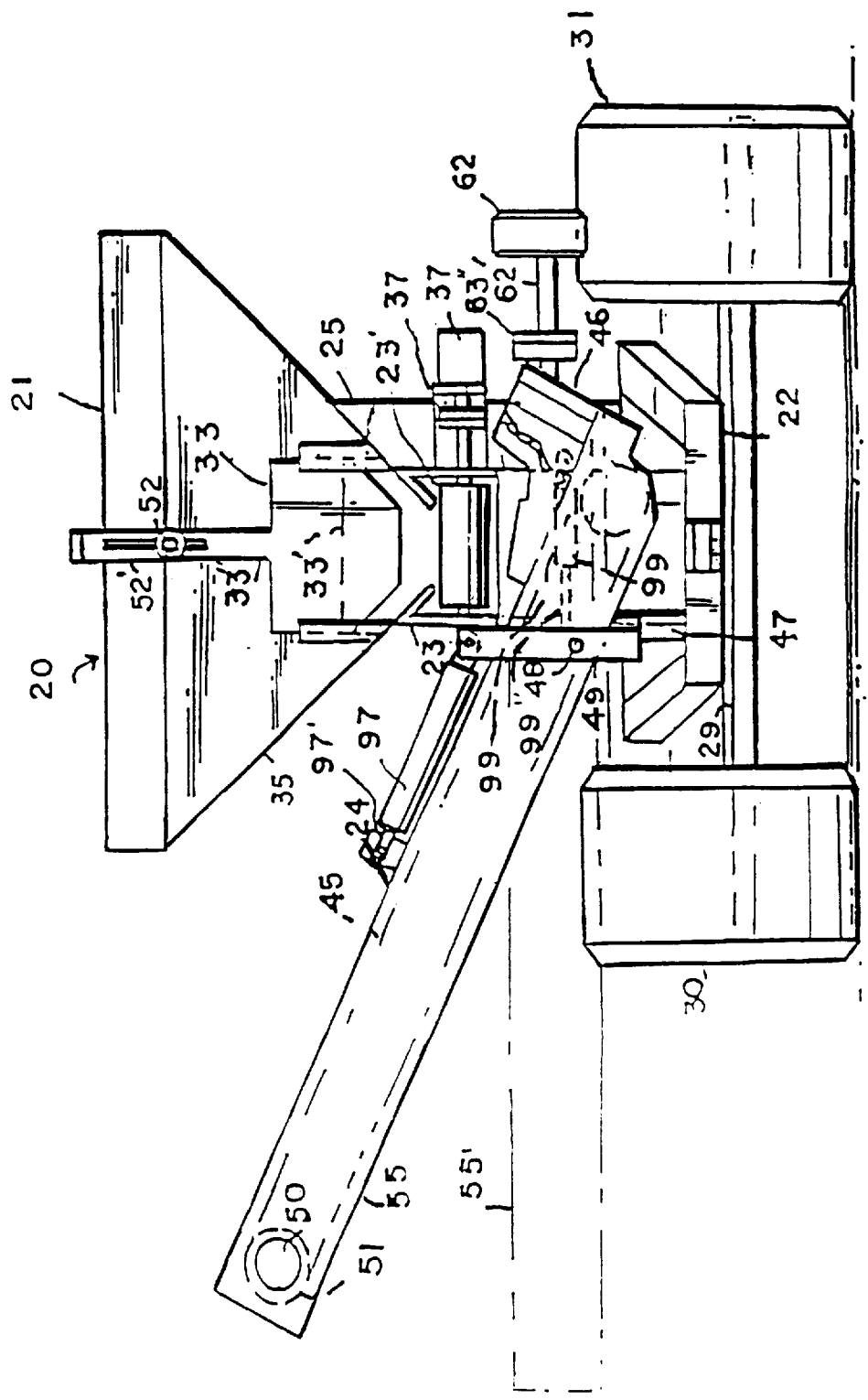
FIG. 10 is a front elevational view of the modified form of the invention.

Referring more particularly to the drawings, in FIGS. 1–5, inclusive, the mobile, material hauling bin 20 is illustrated having a bin 21 mounted on a main frame 22, with the bin having an elongated opening 21' along its bottom. A first conveyor 23 is mounted in length along the opening in the bottom 25 of the bin. A second conveyor 24 is pivotally mounted on the main frame 22, and adapted to be pivoted from a storage position parallel to the length of the frame designated by numeral 24' in FIG. 4, to a position perpendicular and extending laterally of the length of the bin as shown in FIGS. 2 and 4 and designated by numeral 24". A rotary spreader blade 26 is rotatably mounted to the rear end 27 of the bin beneath the rear end 23" of the first conveyor, while the second conveyor 24 is pivotally mounted to the front 28 of the bin. A scraper 29 is mounted beneath the main frame, 22, in front of the pair of wheels 30 and 31 for rotatably supporting the frame and bin, while a conventional drag 32 is pivotally mounted to the frame 22 at the rear of the two supporting wheels 30 and 31 of the device.

The bin 21 of the invention 20 has a pair of plates 33 and 34 slidably mounted over openings 33' and 34' in the front and rear walls 35 and 36 of the bin 21 for opening and closing the openings 33' and 34'. Motor 37 is mounted to power or drive the front rotary drum or drive roller 39 of the conveyor 23 and a motor 38 is mounted to the rear rotary drum or roller 40 of the conveyor 23 for driving the conveyor belt 23' of the conveyor either clockwise or counterclockwise, respectively, when viewed from FIG. 1. Each drive motor 37 and 38 has a slip clutch 37' and 38', respectively, to allow either motor to power the belt 23' in either direction, with the other motor slipping freely on its slip clutch, which will automatically engage the respective motor to its respective drum only when that motor is energized.

A housing 41 is mounted to the rear wall 36 of the bin and surrounds the rear end of the conveyor 23, with a vertical opening 41' through the housing to allow material fed from the rear end of the conveyor belt 23' to travel out the rear opening 34' in the rear wall off the conveyor belt and drop downward through the bottom portion 41" of the opening onto the rotary blade 26 which has upright vanes 26' or plates, which upon rotation of the blade project or throw the material outward from the blade onto the supporting surface adjacent the mobile bin 20. The rotary blade 26 has a shaft 42 fixed thereto which is rotatably mounted to the rear wall of the housing 41 and a motor 43 is mounted to the top of the rear wall of the housing. A pulley 43' fixed to the output shaft of the motor 43 rotates upon rotation and powering of the motor shaft 43' of the motor, which pulley rotates the pulley belt 44 mounted between its pulley 43' on the motor and a pulley 42' on the shaft of the blade, so that powering the motor rotates the pulley drive to rotate the shaft 42 of the blade to rotate the blade 26.

The second conveyor 24 has a resilient upper panel 46 which surrounds the rear end of the conveyor belt 45 so that the rear end of the second conveyor can be pivoted about its pivotally vertical axis of its pivotal mounting 47 to the main frame to pivot near the underside of the rear end of the first conveyor for more readily receiving material from the rear end of the first conveyor, when the motor 37 drives the belt 23' clockwise to convey material out of the front opening 33' down onto the belt of the second conveyor 24, which can convey the material laterally away from the mobile bin invention.

The second conveyor has a horizontal pivotal connection 48 to a pivot frame 49, which pivot frame 49 has sleeves 49' surrounding a pin 49" on the main frame to provide the vertical pivot for pivoting the second conveyor from its parallel position to its lateral perpendicular position to the bin, by the conveyor, pivot frame and sleeves pivoting on the pin 49" of the main frame.

The second conveyor is power driven in a counterclockwise direction, when viewed from FIG. 2, by a motor 50 having its output shaft fixed coaxially with the shaft of the drive roller or drum 51 of the second conveyor, so that powering the motor 50 drives the conveyor belt 45, counterclockwise when viewed from FIG. 2.

The plates 33 and 34 each slide in a pair of L shaped slots 51 so that the plates can slide downward to engage the top of the conveyor belt 23' or slide upward to open the openings 33' and 34' to a selected size. Each plate has a rod 33" and 34" respectively which extend upward from the plates along the front and back walls respectively of the bin and each have a slot 52'. A bolt 52 extends through, and which bolt has a threaded handle threaded onto the bolt to tighten the rods 33' and 34' against the front and back walls to lock the rods and thereby the plates 33 and 34 at a selected height to provide a selected size opening from the bin onto the conveyor belt at each end wall.

Operation

The mobile bin spreading and conveying device 20 operates as follows:

The mobile bin spreading and conveying device 20 will be mounted behind a tractor by attaching the forward end of the frame 22 to the rear hitch of a tractor. The bin 21 will be filled with sand for example and used on golf courses having sand traps or for filling the greens with sand or other materials. When it is desired to spread sand along a path, the motor 37 for powering the first conveyor in a counter clockwise direction will be energized and the rear panel 34 will be raised to create an opening from the bin onto the rear end of the first conveyor 23. The motor 43 will be energized to rotate the blade 26 and the sand will be conveyed from the bin on the first conveyor 23 into the housing 41 at the rear of the bin where it will drop off the conveyor belt as it moves and will drop down onto the rotating blade 26, where the vanes 26' fixed to the blade at radial intervals about the circular blade will engage the sand and propell the sand away from the blade and bin device 20, spreading the sand on the ground as the device 20 is towed along the ground.

If it is desired to use the device 20 for stockpiling sand or other materials, the bin will be filled with the material to be stockpiled and towed with the tractor to the location for stockpiling. The second conveyor 24 will be pivoted about a vertical axis on pivot frame 49 on pin 11, from its position in FIG. 1, shown parallel to the length of the bin to a position laterally of the length of the bin, so that the outer end 24''' of the conveyor will be over the location on the ground, the operator intends to stockpile the sand. Thereupon, the operator will pivot the other end of the conveyor 24 upward about its pivotal mounting 48, so that the other end of the conveyor is higher than the height the stockpile of sand intended to be made on the location. When the second conveyor has been pivoted upward to a suitable height, such as shown in solid lines in FIG. 2, and designated by numeral 55, the operator will grasp the chain 56, attached to the yoke 57, which yoke 57 is pivotally mounted to the upper outer end of the conveyor 24 and draw the chain toward the attaching arm 58, fixed to the front wall of the bin. The chain will be inserted in the slot 58' in the arm to hold the chain taut with the yoke pivoted toward the slot to thereby hold the upper end 24" of the conveyor in its raised position as shown in FIG. 2 and indicated by solid lines 55. Whereupon the motor 37 of the first conveyor 23 will be energized to rotate the conveyor belt 23' clockwise, when viewed from FIG. 1. The conveyor 24 is shown in phantom lines 55', before being elevated to the operative height.

The front panel 33 will be raised to create an opening of a selected size for conveying the sand at the desired rate, The motor 37 will be energized to rotate the conveyor belt 23' of conveyor 23 clockwise, so that sand will be conveyed by the first conveyor 23 off its forward end, where it will drop down onto the rear 24" of the second conveyor onto the conveyor belt 45, and be conveyed by the rotation of the belt upward and laterally outward from the device 20 onto the ground to form a pile of sand at the selected location.

Thus it will be seen that a novel towable mobile bin has been provided which can be used to spread sand onto the ground while towing the bin along the ground from one end of the bin; or by simply reversing the rotation of the first bin conveyor, and pivoting a second conveyor into position with its one end under the other end of the first conveyor, the two conveyors can be used to stockpile materials from the bin by conveying the materials out the other end of the bin with the first conveyor onto the other end of the second conveyor and conveyed by the second conveyor onto a pile beside the mobile bin device.

It may be desirable to use a two rotary blade spreading mechanism at the one end of the conveyor instead of the one rotary blade as illustrated. The two spreading blades may be mounted laterally beside one another at the rear of the bin and rotated in opposite directions to one another to receive the sand from the bin and project it outward onto the ground for spreading the sand.

Also, a conventional scraper 29 may be mounted to the main frame by being fixed to a pair of arms 53 and 53' with the other ends of the arms pivotally mounted to the main frame about a horizontal axis. A pair of hydraulic piston and cylinders 54 and 54' may be mounted with their pistons attached to each arm and the cylinders attached to the main frame as shown and hydraulically actuateble to retract the pistons into the cylinders to pivot the arms upward clockwise, when viewed from FIG. 1, relative to the frame 21 to raise the scraper 29 upward off the ground when not in use.

Thus, it will be sen that a novel spreading and conveying apparatus has been provided for spreading and conveying grass seed, fertilizer, sand and other materials having small particles. The device has a side uploading conveyor at one end and a spreader at the other end, so that the operator may quickly change from one type of operation to the other without any significant delay. The device may be readily used on golf courses to fill sand traps and for top dressing, for example, and for other operations.

An alternate drive to the first conveyor belt 23 is provided when driving the belt 23 counterclockwise, when viewed from FIG. 2, so that the material in the bin conveyed to the rotary blade 26 for spreading. The alternate drive is provided by a small wheel 62 frictionally engaging the left transport wheel 30 peripherally, and rotatably driven by the left wheel 30 when the device 20 is moved along the ground with the rotation of the wheel 30 rolling on the ground rotating the small wheel 62. The wheel 62 is fixed to a shaft 62', which shaft is rotatably mounted in the sleeve 63 fixed to the lower frame 22 of the bin. The shaft 62' has a slip clutch connection 63 to an inner shaft 64 so that when the clutch is energized to two shafts rotate together when the small wheel is rotated by the left wheel 30. When the slip clutch connection 63" is engaged, the inner shaft rotates a gear that rotates chain belt 64" which rotates a gear fixed axially to the rear drum 40 of the first conveyor, which rotates the conveyor belt 23 counterclockwise when viewed from FIG. 2. The drive to the conveyor belt 23, through the frictional wheel engagement of wheel 62 to wheel 30 rotates the conveyor belt 23 at a slower rate of speed than is provided by the electric motor 38, so that a varied selection of speed is provided to the conveyor belt when driving it to provide sand to the spreader blade.

A elongated rod 27' is fixed to the side of the device to support the conveyor 24 on the device, when it is in its storage position.

Also, the main frame 22 has a pivotal mounting 65 at its rear cross beam member 66 of the main frame 22, for pivotally mounting a conventional drag member 67 to the mobile bin device 20. The drag member 67 has a frame 68 with a pivot 68' at its forward end for pivotally mounting the drag member to the mobile device, so that the drag member may pivot about the vertical axis as it is dragged along the surface of the ground.

Also, the bin device 20 may be used with a scraper 29 mounted to the device 20, with the unloading conveyor left in its stored position along beside the bin 21, parallel to the bin, a shown in FIG. 1, and as shown in dashed lines in FIG. 4 and designated by the numeral 24'. When the scraper is used in this instance, the bin 21 will be filled with the material to be leveled on the ground by the scraper and the conveyor 24 left in its stored position beside the bin; and the device will be towed behind a tractor. The front slide gate 37 will be adjusted to the desired height for depositing the desired amount of material on the ground in front of the scraper. The motor 37 will be energized while towing the device, causing the conveyor belt 23' to rotate clockwise, when viewed from FIG. 1, conveying the material forward from the bin on the conveyor and off the front end of the conveyor 23, directly onto the ground. Dumping the material onto the ground as the device moves forward; the scraper, mounted behind the front end of the conveyor, will then engage the dumped material on the ground and act to level it. Thus, the device 20, in this instance, does not use either the spreading blade 26 or the second conveyor 24.

The scraper 29 has a conventional box like frame, with a back and bottom panel 67'. The bottom panel has a leading edge 68", which acts to scrape the ground and materials on the ground in a conventional manner.

Referring more particularly to the drawings, in FIGS. 6–9, inclusive, the preferred form of the invention with the milling or grinding mechanism modification 70 is illustrated with the hammer mill or grinding mechanism 70 illustrated mounted to the bin 22 of the mobile bin 20, the mobile bin 21 having a frame 21 with a bin 22 mounted on the frame and two wheels 23 mounted to the bottom of the rear of the frame for rotatably supporting the mobile bin 21 and mill attachment invention 70 on the ground and the two conveyors 23 and 24 and spreading blades or discs similar in contruction and operation as described in the form of the invention illustrated in FIGS. 1–5, inclusive. The bin 2 has a elongated slotted opening 22 along its bottom and a conveyor 24 is mounted along the bottom of the bin, beneath the slotted opening 22 along the bottom of the bin. he bin has side walls 22" and front and rear walls 22'" and 22"".

A hammer mill attachment modification 70 has front and rear walls 71' and 71" with the front wall 71' mounted to the rear side 22"" of the bin adjacent the rear end of the conveyor 24. The mill attachment 70 has a pair of spaced upper and lower grinding wheels 72 and 73 rotatably mounted in horizontal axes in side walls 74 and 74' of the frame or housing 75 of the attachment. The bin rear wall 22"" an opening 21' adjacent the rear end of the conveyor 23 and the front opening 75" of the milling attachment housing 75. The milling attachment has an output opening 75' in the bottom of the housing. A pair of spreading wheels 76 and 77 are rotatably mounted in the housing 75 beneath the milling attachment output opening 75' of the housing for receiving the milled material after milling by the hammer mill attachment for spreading the material on the ground.

A gasoline motor 79 is mounted to the top of the milling attachment housing 75. A output pulley 80 is mounted to the output shaft 79' of the motor 79, and one pulley 81 is mounted over the input shaft 72' of grinding or milling wheel 72. A pair of pulleys 82 and 82' are mounted to the input shafts 72' and 73' of the milling wheels 72 and 73. A pulley belt 83 is mounted over the pulleys 82 and 82' and another pulley belt 83' is mounted over pulleys 80 and 81 so that the gasoline motor drives the pulley belts and the pulley belts drive the pulleys to drive the input shafts 72' and 73' of the milling wheels 72 and 73 to rotate both milling wheels 72 and 73 in the counter clockwise directions when viewed from the right side as shown in FIG. 8, and as illustrated by the arrows 84.

Each of the milling or grinding wheels 72 and 73 has a plurality of elongated metal plates 85 and a plurality of center discs 86 and 87. The discs 86 and 87 are fixed coaxially on the center shafts 72' and 73' of wheels 72 and 73, respectively, and are mounted in spaced intervals along each center shaft 72' and 73 with the elongated plates 85 positioned in the space between each disc 86 and 87. Each elongated plate 85 has its inner end 85' pivotally mounted to each disc 86 and 87 at four pivot points 85" which are at four intervals, ninety degrees from one another, about the outer circumferential portions of each disc and about the wheel's center axis 36', with the outer ends of each elongated plate 85 being free to pivot about their pivotal mountings 85". The grinding or milling wheels 72 and 73 rotate with their center shafts rotating and the discs rotating and the centrifugal force of the rotation will act to throw the outer ends of the plates 85 outward, causing them to pivot outward about the pivot points 85" on the discs, with the movement of the plates 85 relative to the discs 86 and 87 acting to mill and grind material located between them. The Figures of the drawings illustrate the grinding wheels 72 and 73 in rotation so that the plates are shown pivoted outward by centrifugal force as illustrated. A V shaped plate 88 is mounted in the housing to the front of the housing between the grinding wheels 72 and 73 to guide the material back into the upper and lower wheels and downward to facilitate the grinding.

The spreading wheels 76 and 77 have a pair circular metal spreading discs 89 and 90 which are rotatably mounted on each side of the housing 75 beneath the milling or grinding wheels 72 and 73 with upright flanges 89' and 90' fixed to the discs to engage the milled material and throw it outward. Each spreading wheel has an electric motor 91 and 91' also mounted to the housing for powering and rotating the discs 89 and 90. A cover 92 is mounted to the housing 75 and extends over the discs to provide a guard against the operator accidentally running into the discs when they are rotating.

Operation of the Milling Wheels and Mobile Bin is as follows:

The mobile bin device 21 with the milling attachment 70 will be towed behind a tractor or the like with the bin filled with spreading material. When the device reaches the area that it is desired to spread the material in the bin; the power to the conveyor 23 of the device, beneath the bin, will be energized to cause the conveyor belt to rotate clockwise when viewed from FIG. 5, and the bin opening panel 34 will be raised to a selected height for allowed a selected quantity of the material to be carried by the conveyor belt out of the bin. The top surface 23" of the conveyor belt 23' is approximately horizontally even with the space between the upper and lower grinding or milling wheels 72 and 73. Consequently, as the conveyor belt 23' continues in its rotation, with material from the bin gravitating down through the bin opening onto the conveyor belt; the conveyor belt action will feed the material from right to left, when viewed from FIG. 5 from the left end of the conveyor belt, toward and in between the upper and lower wheels 72 and 73, as indicated by the arrow 94. The counterclockwise rotation of the lower wheel 73 will also cause the material to move forward between the wheels. The plates 85 may rest between plates 86 and 87 and when the discs or plates 86 and 87 are in motion, they will have swung outward under centrifugal force to their position shown in solid lines in FIG. 5 due to the rotation of the wheels 72 and 73 rotating the discs and plates. As the material coming from the conveyor belt approaches the plates 85 of the wheels; the plates 85 in the wheel rotation will strike or flay against the material and the reaction may cause the plates to swing back and into the discs. As the plates continue their rotation by the rotation of the discs, centrifugal force will against cause the plates to swing out again to their position shown in solid lines so that they can repeat the striking or flaying of the material, as they again, in their rotation, reach the material coming into the discs from the conveyor; and the plates 85 will again flay or strike against the material being fed in between the discs 86 and 87 from the conveyor belt to pulverize the material into smaller pieces more suitable for the operation. The flow of material from the conveyor belt in between the discs is indicated by the arrow 94. The housing 75 has a curved cylindrical front lower portion 95 close to the path of the plates 85 as they swing about their arc on the flower grinding wheel which acts to keep the material being ground close to the plates 85 so cause them to be more effectively ground by the plates in their movement. The v shaped plate 88 with its pair of upper and lower curved portions 88' and 88" is mounted to the housing 75 adjacent the rear lower portions of the wheels 72 and 73 and also acts to keep the material being ground close to the plates 85 when the plates move to also more effectively grind or mill the material.

The milling attachment 70 will be removable mounted to the mobile bin so that the mobile be can be operated with or without the milling attachment.

If the milling attachment is not being used with the mobile bin, the spreading wheels will be at a higher position than shown in FIG. 5 for example as the spreading wheels will be attached directly to the rear bin housing 43 as shown in FIG. 1, so that the material coming from the bin onto the conveyor can go directly from the conveyor onto the spreading wheels 76 and 77 by the action of the conveyor conveying the material onto the spreading wheels 89 and 90. Cover 92 is mounted over the tops of the spreading discs 76 and 77 and extends over the tops and along the sides of the discs to prevent persons from accidently coming into contact with the discs while they are rotating.

Then, by detaching the spreading wheels 76 and 77 from their upper location as described and re attaching the milling attachment housing to its place as shown in FIG. 5, at the bottom of rear of the conveyor, the spreading wheel housing can then be attached to the bottom of the milling attachment housing, as shown in FIG. 5 in solid lines, so that the milling wheels can be used for the intervening milling operation. The spreading and conveying apparatus, to which the milling attachment is attached, is previously shown and described herein.

When using the second conveyor 23 at the opposite end of the device, a hydraulic piston and cylinder 97 may be mounted between the frame 49 and the second conveyor 23 to pivot the second conveyor upward and downward about the horizontal pivotal connection of the conveyor to the frame 49 as illustrated in FIG. 5 instead of the manual chain and yoke adjustment illustrated in FIGS. 1–4, inclusive. The piston 97' of the piston and cylinder 97 is pivotally mounted at its one end to the conveyor; and the cylinder 97" of piston and cylinder 97 is pivotally mounted at its other end to the frame 49. Hydraulically powering piston and cylinder 97 to telescope and retract the piston 97' into and out of the cylinder 97" acts to raise and lower the second conveyor abut the pivot 48 to the frame 49 to power the raising and lowering of the second conveyor 23 about the frame 49. Also, a second hydraulic piston and cylinder 99 may be mounted between the frame portion 49 and the second conveyor to power the pivoting of the second conveyor about its vertical pivotal connection formed by the pin and sleeve 49" and 49', respectively to power the pivoting of the second conveyor in a horizontal path toward and away from the bin 21. The cylinder 99' of the piston and cylinder 99 will be pivotally mounted at its one end 100 to the frame 21 and the piston 99" will be pivotally mounted to a vertical plate 49"" fixed to the frame 49 of the second conveyor, so that powering the piston outward in a telescoping action pivots the second conveyor about its vertical pivotal mounting to the frame s away from the frame as illustrated in the deawings.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. A mobile bin device comprising a main mobile frame with a elongated bin mounted thereon with said bin having an opening along its bottom along the length of the bin, a first elongated belt conveyor and a second elongated belt conveyor;

said first conveyor being mounted at a fixed position on said frame beneath said bin opening and having remote ends and extending in length along the bin from one end of the bin to the other end of the bin, said second elongated conveyor being pivotally mounted at one of its ends on said frame at a location on said frame adjacent said one end of said first conveyor to pivot about a vertical axis from a storage position wherein said second conveyor extends parallel in length along the length of said first conveyor and bin and beside and adjacent said first conveyor to various different operative positions wherein said second conveyor extends laterally outward of said first conveyor with its one end below and beneath said one end of said first conveyor, said second conveyor being further pivotally mounted about a horizontal axis at its one end at said location adjacent said one end of said first conveyor to pivot said other end of said second conveyor upward or downward while said second conveyor is laterally outward from said first conveyor and the one end of the second conveyor remains beneath and below the one end of the first conveyor, said first and second conveyors each having movable belts thereon whereby material may be conveyed on said first conveyor belt from said bin opening along said first conveyor to said one end of said first conveyor and then conveyed onto said one end of said second conveyor belt while said second belt conveyor extends laterally outward from said first conveyor, and further may conveyed upward or downward away on said second conveyor belt from said first belt conveyor upward or downward laterally away from said first conveyor.

2. A mobile bin according to claim 1, wherein means on said frame for supporting said second conveyor in its said parallel storage position besides the first conveyor.

3. A mobile bin according to claim 2, wherein said bin includes power means to adjustably support said second conveyor in various pivotal height positions when said second conveyor is positioned laterally relative to said first conveyor.

4. A mobile bin according to claim 1, wherein said bin includes means to adjustably support said second conveyor in various height positions when said second conveyor is positioned laterally relative to said first conveyor.

5. A mobile bin according to claim 1, wherein said bin is recessed along it lower length portion with said second conveyor being receivable in said recess when stored in said parallel relation to the first conveyor, with said upper portion of said bin extending over the top of said second conveyor.

6. A mobile bin device comprising a main mobile frame with an elongated bin mounted thereon with said bin having an opening along its bottom, a first elongated belt conveyor and a second elongated belt conveyor;

said first conveyor being mounted in a fixed position on said frame beneath said bin opening and having remote ends and extending in length along the length of the bin from one end of the bin to the other end of the bin, said second elongated conveyor being pivotally mounted at one of its ends on said frame adjacent said one end of said conveyor to pivot about said one end about a vertical axis from a storage position wherein said second conveyor extends parallel in length along the length of the first conveyor and bin and beside, and adjacent said first conveyor and bin to various different lateral operative positions wherein said second conveyor extends laterally outward of said first conveyor with its one end below and beneath said one end of said first conveyor;

said second conveyor being further pivotally mounted about a horizontal axis at its said one end at said location adjacent said one end of said first conveyor to pivot said other end of aid conveyor upward or downward while said one end of said second conveyor remains beneath and below the one end of the first conveyor and while said second conveyor extends laterally outward from said first conveyor, means to selectively adjust said second conveyor about said horizontal axis;

said first and second conveyors each having movable belts thereon, whereby material may be conveyed on said first conveyor belt from said bin opening along said first conveyor to said one end of said first conveyor and then conveyed onto said one end of said second conveyor while said second belt conveyor extends laterally outward from said first conveyor, and further may be conveyed upward or downward away on said second conveyor belt from said first belt conveyor upward or downward laterally away from said first conveyor.

* * * * *